(12) United States Patent
Min et al.

(10) Patent No.: US 6,586,890 B2
(45) Date of Patent: Jul. 1, 2003

(54) LED DRIVER CIRCUIT WITH PWM OUTPUT

(75) Inventors: Young-Kee Min, Elm Grove, WI (US); Bernd Clauberg, Schaumburg, IL (US); Bertrand J. E. Honteĺe, Dalfsenlaan (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/012,000

(22) Filed: Dec. 5, 2001

(65) Prior Publication Data

US 2003/0102819 A1 Jun. 5, 2003

(51) Int. Cl.[7] .................... H05B 41/14; H02M 3/335
(52) U.S. Cl. .................... 315/224; 363/21.15
(58) Field of Search ................ 315/224, 247, 315/129, 209 R, 307, 308; 363/15, 21.11, 21.12, 21.15, 21.17; 362/800

(56) References Cited

U.S. PATENT DOCUMENTS

| | | | | | |
|---|---|---|---|---|---|
| 5,856,779 | A | * | 1/1999 | Friday | 340/479 |
| 5,998,929 | A | * | 12/1999 | Bechtel et al. | 315/82 |
| 6,150,771 | A | * | 11/2000 | Perry | 315/291 |
| 6,177,782 | B1 | * | 1/2001 | L'Hermite et al. | 323/222 |
| 6,239,716 | B1 | * | 5/2001 | Pross et al. | 340/815.4 |
| 6,313,589 | B1 | * | 11/2001 | Kobayashi et al. | 315/309 |
| 6,320,330 | B1 | * | 11/2001 | Haavisto et al. | 315/291 |
| 6,362,578 | B1 | * | 3/2002 | Swanson et al. | 315/307 |
| 6,408,998 | B1 | * | 6/2002 | Saito et al. | 191/2 |

* cited by examiner

*Primary Examiner*—Don Wong
*Assistant Examiner*—Minh D A

(57) ABSTRACT

The driver circuit for light emitting diodes (LEDs) of the present invention provides power to LEDs using pulse width modulation (PWM). The driver circuit 100 uses current feedback to adjust power to LED arrays 54 and provides a full light and a dim mode.

31 Claims, 5 Drawing Sheets

LED DRIVER CIRCUIT WITH PWM OUTPUT

TECHNICAL FIELD

The technical field of this disclosure is power supplies, particularly, a driver circuit for light emitting diodes (LEDs) using pulse width modulation (PWM).

BACKGROUND OF THE INVENTION

Traditionally, incandescent and fluorescent illuminating devices have been used as light sources in automobiles and other vehicles. However, significant advances in the technology of light emitting diodes (LEDs) have made LEDs attractive for use in vehicles, because of their long operating life, high efficiency, and low profile.

The electrical characteristics of LEDs are such that small changes in the voltage applied to the LED lamp will cause appreciable current changes. LED light output is proportional to the LED current and, therefore, a current source is the preferred method of driving the LEDs. At present, LED drivers in vehicles use driver circuits with voltage source outputs, and current limiting resistors or linear current regulators. Current limiting resistors cause power loss, making the driver circuits inefficient. In addition, current regulation is not precise. Driving LEDs at other than nominal current can reduce LED life and produce unpredictable light output. As the application of LED's in vehicles expands to higher power applications, such as the rear combination lights (Stop/Turn/Tail), the performance of these driver circuits is no longer acceptable in terms of efficiency and regulation.

It would be desirable to have a driver circuit for LEDs that would overcome the above disadvantages.

SUMMARY OF THE INVENTION

One aspect of the present invention provides a driver circuit for LEDs with good regulation and efficiency.

Another aspect of the present invention provides a driver circuit for LEDs maintaining operation at the LEDs' nominal current.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PREFERRED EMBODIMENT

The driver circuit for light emitting diodes (LEDs) of the present invention provides power to LEDs using pulse width modulation (PWM). The power supply uses current feedback to adjust power to the LEDs and provides a full light and a dim mode.

Figure 1:
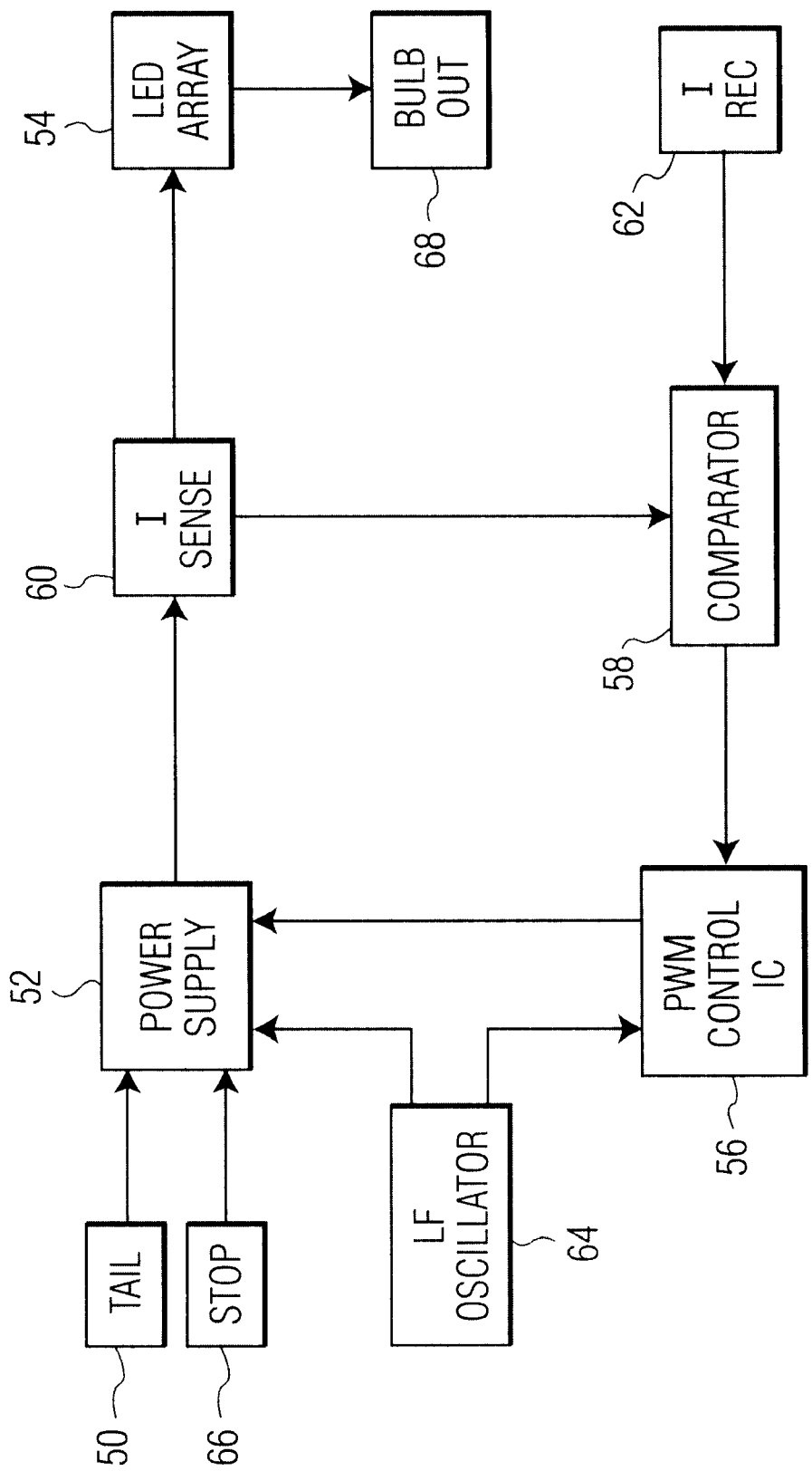
FIG. 1 shows a block diagram of a driver circuit for LEDs made in accordance with the present invention.
Figure 2A:
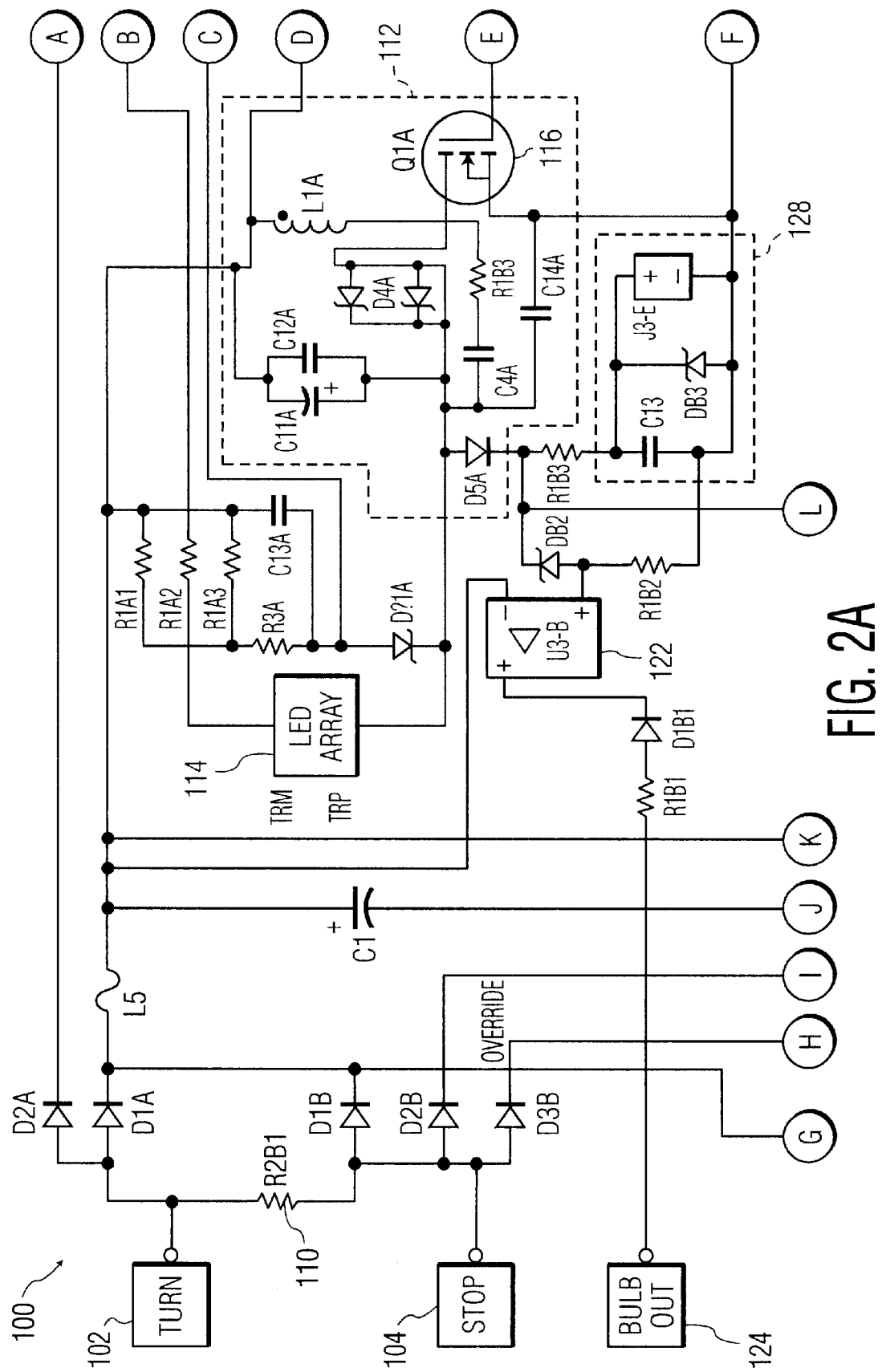
FIGS. 2A–2D show a schematic diagram for a driver circuit for LEDs made in accordance with the present invention.
Figure 2B:
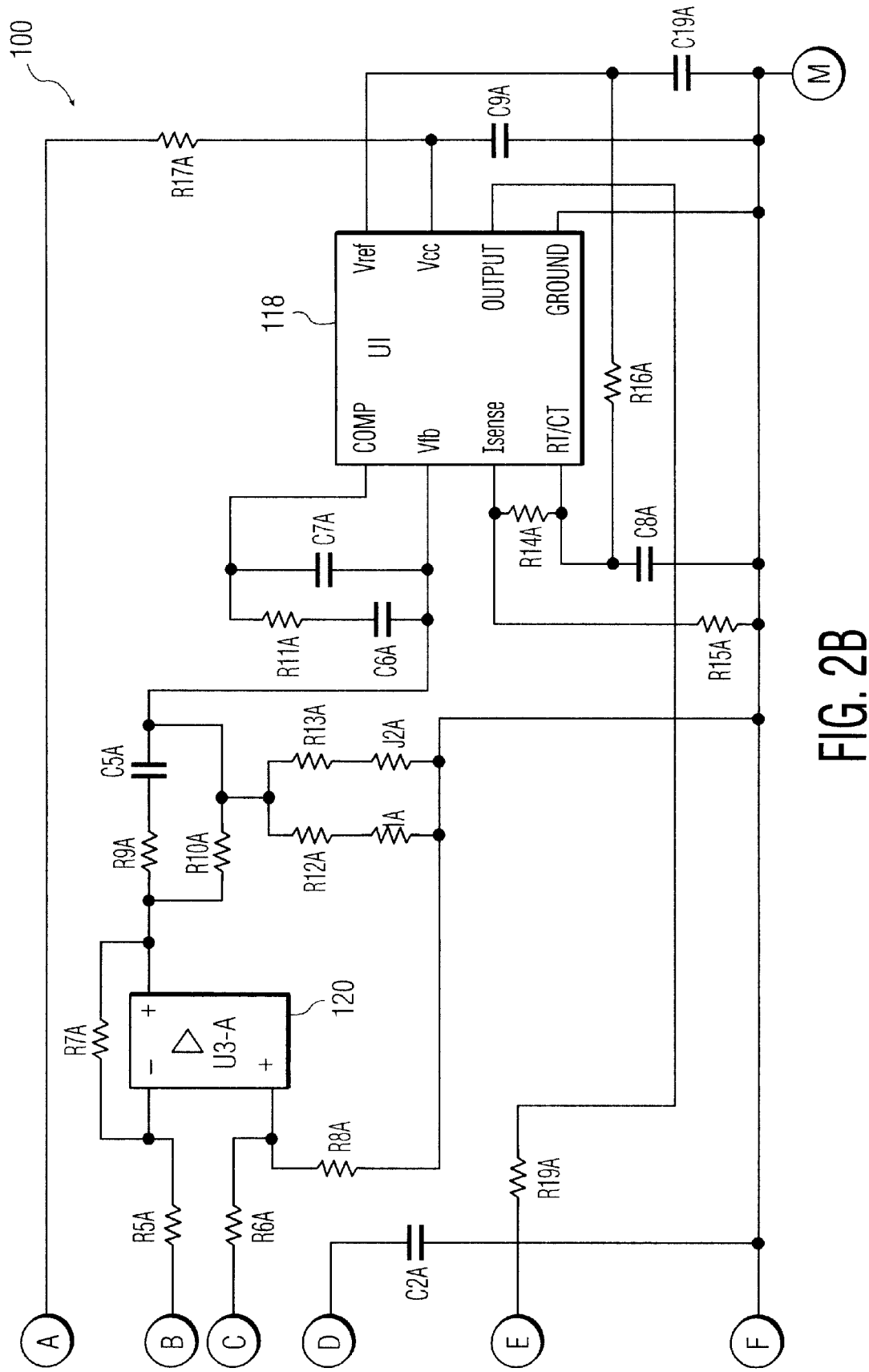
Figure 2C:
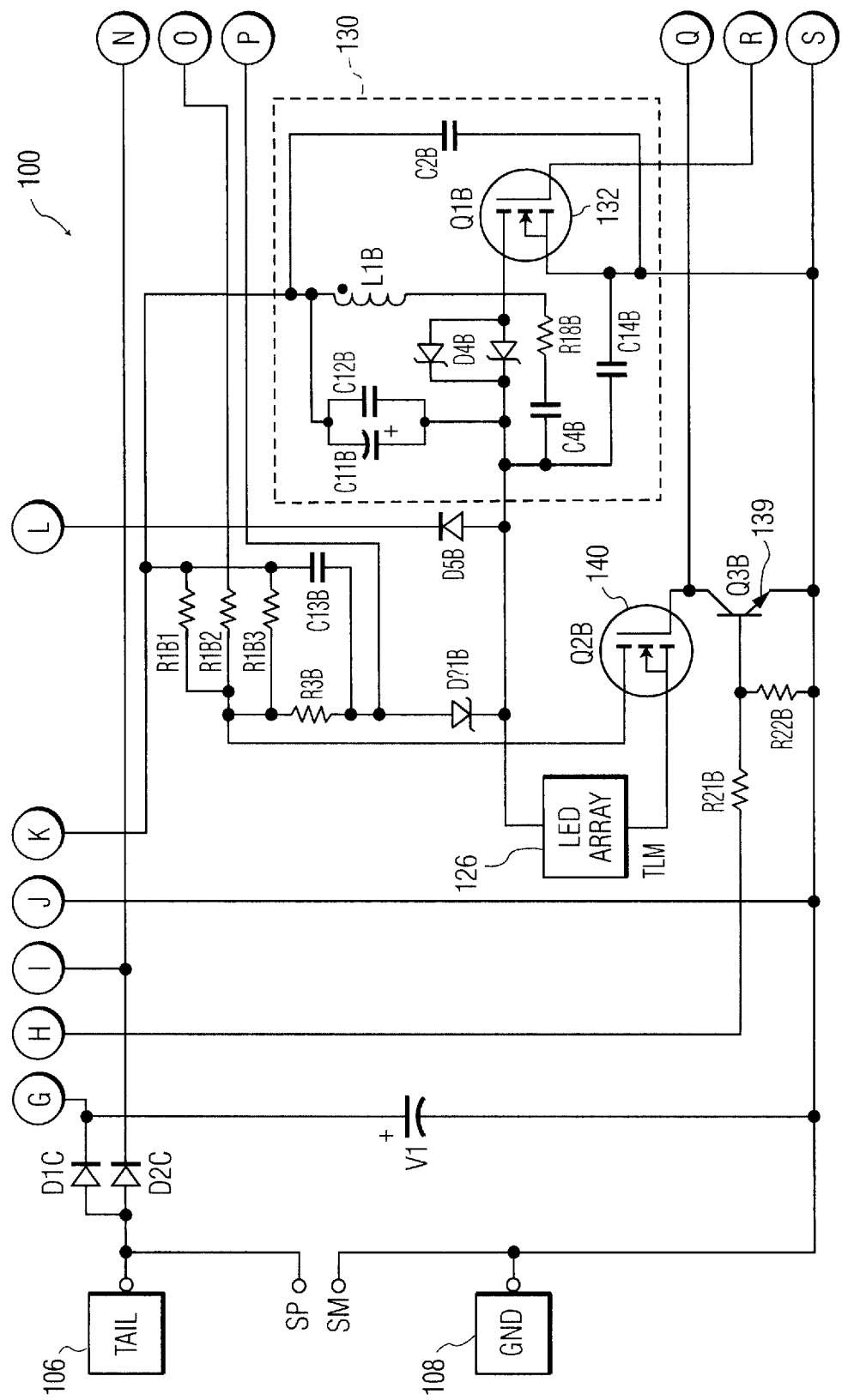
Figure 2D:
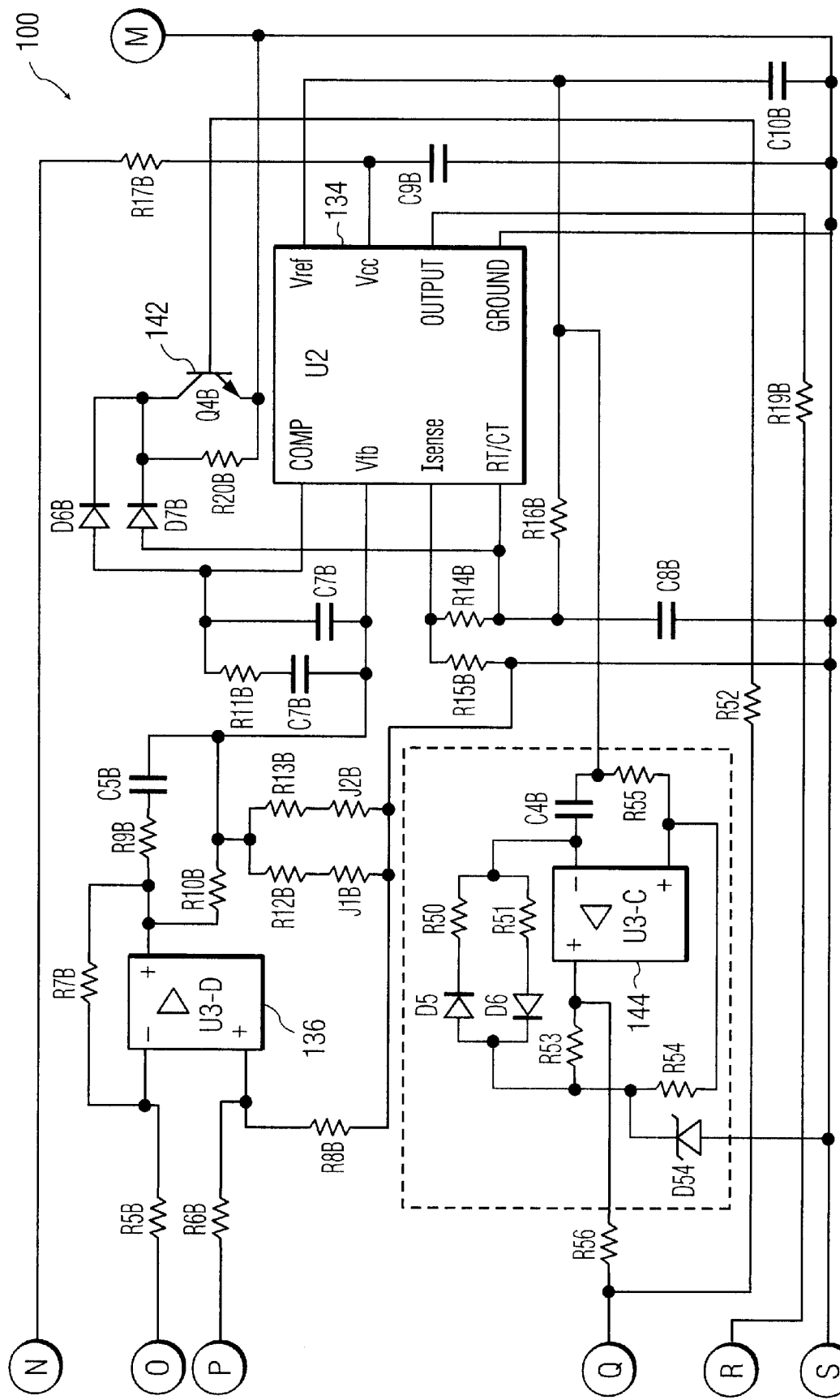

FIG. 1 shows a block diagram of a driver circuit for LEDs made in accordance with the present invention. A tail lamp input signal is provided at block 50 and supplied to power supply 52. The power supply 52 can be a DC/DC converter such as a buck-boost power supply or other alternatives, such as a boost, buck, or flyback converter. The power supply 52 supplies power for LED array 54 and is controlled by PWM control IC 56. The PWM control IC 56 provides a high frequency periodic drive signal of varying pulse width to direct the power supply 52 to supply power as required by the LED array 54 in response to a feedback signal. In one embodiment, the drive signal can be a square wave oscillating between 0 and 12 volts with a frequency of 20 kHz. The comparator 58 provides the feedback signal by comparing the sensed current signal from current sensor 60 and the reference signal from reference current source 62.

Low frequency oscillator 64 provides a low frequency oscillating signal to the power supply 52 and the PWM control IC 56. The low frequency places the driver circuit in the dim mode as long as the tail lamp input signal 50 is present and the stop input signal 66 is not present. The input signals are illustrated as a tail lamp input signal and a stop input signal as examples, but the input signals can be any signals desired where a dim mode corresponds to one input signal and a full light mode corresponds to a second input signal. The low frequency of the low frequency oscillator 64 is lower than the drive signal from the PWM control IC 56. The low frequency oscillating signal oscillates between a first state and a second state. In one embodiment, the oscillating signal can be a square wave oscillating between 0 and 16 volts with a frequency of 200 to 300 Hertz. When the low frequency oscillating signal is in a low state, the low frequency oscillating signal blocks the power to the LED array 54 from the power supply 52 and holds the output of PWM control IC 56 low. When the low frequency oscillating signal changes from low to high, the output of PWM control IC 56 is synchronized to the transition. This allows the use of lower operating frequency in conjunction with the dim mode, while maintaining stable LED current. When the stop input signal 66 is present at the power supply 52, the power supply 52 and the PWM control IC 56 are unaffected by the low frequency oscillating signal from the low frequency oscillator 64 and the driver circuit is placed in the full light mode. In another embodiment, where only full light mode is desired, the low frequency oscillator 64 and the tail lamp input signal 50 can be omitted and an alternate input to the stop input signal 66, such as a turn input signal, can be provided.

The low frequency of the low frequency oscillator 64 is selected to be high enough to ensure that no flicker is visible from the LED array 54; for example, in one embodiment the low frequency can be selected to be about 200 to 300 Hz. The low frequency is also selected to be low enough to limit electromagnetic interference (EMI) from the power supply 52, yet high enough to provide a reasonable inductance component for magnetics of the power supply 52. Extremely low EMI specification limits are imposed by the automotive industry. Bulb out signal at block 68 provides a signal indication that the LED array 54 has burned out or has become disconnected.

FIGS. 2A–2D show a schematic diagram a driver circuit for LEDs made in accordance with the present invention. TURN input 102, STOP input 104, and TAIL input 106 provide control input signals to driver circuit 100 from the vehicle. The control input signals can be from 6 to 16 volts, but are typically 14.5 volts, for example. The control input signals are normally in a low state and change to high when certain operation is desired. GROUND input 108 supplies the ground reference for the driver circuit 100. Jumper 110 can provide optional operating modes for foreign and domestic vehicles, so for foreign vehicles one LED array is used as a turn signal and another LED array is used for a tail light, while for domestic vehicles one LED array is used as a combined stop and turn signal and another LED array is used for a combined stop signal, turn signal, and tail light. Diodes and capacitors connected to the control inputs provide EMI filtering and reverse voltage battery protection.

First power supply 112 supplies current to first LED array 114. The first LED array 114 operates in the full light mode in domestic vehicles in response to the TURN input 102 or the STOP input 104 control signals. The power supply 112 operates in PWM mode control to regulate the current in the first LED array 114 to the required value. First FET 116 switches the first power supply 112 rapidly in response to a drive signal from a first PWM control IC 118. The first PWM control IC 118 can be an integrated circuit such as a UCC2813-3 manufactured by Unitrode, a UC2842 series manufactured by ST Microelectronics, or the like. In one embodiment, the drive signal can be a square wave oscillating between 0 and 12 volts with a frequency of 20 kHz. The first PWM control IC 118 varies the pulse width of the drive signal in response to a feedback signal from first op amp 120. The output of op amp 120 represents a scaled version of the first LED array 114 current, which is compared to an internal reference of the PWM control IC. The first op amp 120 and the first PWM control IC 118 provide a feedback mechanism so that the LED current remains constant and meets the LED array demand. This preserves LED life and produces predictable light output. In the embodiment shown, resistors between the first power supply 112 and the first LED array 114 are used for LED current sensing; a plurality of resistors is used due to the low power dissipation capacity of the surface mount resistors used here.

Second op amp 122 compares a system input voltage signal to the downstream voltage signals from first LED array 114 and second LED array 126 and provides a BULB OUT signal 124, alerting the driver that an LED array is burnt out or disconnected. A voltage supply 128 supplies the op amp ICs using the higher voltage of the first LED array 114 and the second LED array 126, or functionally implemented via diodes D5A and D5B. A protection zener is used to clamp the voltage across the op amp supply to a value lower than the op amp rating in case of transients on the input signals (Turn, Stop or Tail inputs).

The portion of the driver circuit 100 supplying the second LED array 126 is similar to the portion of the driver circuit 100 supplying the first LED array 114, except that the portion of the driver circuit 100 supplying the second LED array 126 is able to drive the second LED array 126 in a low frequency dim mode in response to the TAIL input 106 control signal. The portion of the driver circuit 100 supplying the first LED array 114 can only drive the first LED array 114 in the full light mode.

Second power supply 130 supplies current to the second LED array 126. In domestic vehicles, the second LED array 126 operates in the full light mode in response to the STOP input 104 control signal and in the dim mode in response to the TAIL input 106 control signal. The LED array current signal is pulse width modulated, i.e., the current to the second LED array 126 is a square wave of a predetermined frequency and a peak current close to the LED array nominal value, with the pulse width set at a fixed duty cycle depending on the power required by the second LED array 126. In one embodiment, the current signal can be a square wave oscillating between 0 and 600 mA with a frequency of 200 to 300 Hertz.

In the full light mode in response to the STOP input 104 control signal, first transistor 138 provides a ground path so that PWM FET 140 conducts continuously, rather than following the low frequency oscillation of low frequency oscillator 144, allowing continuous current flow through the second LED array 126. The ground path through the first transistor 138 also keeps second transistor 142 from conducting. This keeps the second PWM control IC 134 in the full light mode, because the second PWM control IC 134 does not receive oscillating synchronization signals through the second transistor 142. Second FET 132 switches in the same fashion as first FET 116 described above.

In the dim mode, when the STOP input 104 control signal is not present and the TAIL input 106 control signal is present, first transistor 138 is off, so that PWM FET 140 cycles on and off in response to the oscillating signal from low frequency oscillator 144. In one embodiment, the oscillating signal can be a square wave oscillating between 0 and 16 volts with a frequency of 200 to 300 Hertz. This cycles the second LED array 126 on and off as the PWM FET 140 cycles on and off. The frequency of the low frequency oscillator 144 is selected to be high enough to ensure that no flicker is visible from the second LED array 126. For example, in one embodiment the low frequency duty cycle can be selected to be about 10% with an oscillation frequency of about 200 to 300 Hz. The frequency is also selected to be low enough to limit electromagnetic interference (EMI) from the second power supply 130, yet high enough to provide a reasonable inductance component for magnetics of the second power supply 130. Extremely low EMI specification limits are imposed by the automotive industry.

In the dim mode, the oscillating output of the low frequency oscillator 144 also controls the oscillating synchronization signals to the second PWM control IC 134 through the second transistor 142. When the oscillating signal from the low frequency oscillator 144 is low, the second transistor 142 is off and the second PWM control IC 134 is active. When the oscillating output of the low frequency oscillator 144 is high, the second transistor 142 is on and the second PWM control IC 134 is held in a reset state. This prevents the output voltage of the second PWM control IC 134 feeding the second FET 132 from rising while the second LED array 126 is off. The second transistor 142 also synchronizes the second PWM control IC 134 with the low frequency oscillator 144 as the low frequency oscillator 144 output switches from high to low, activating the second PWM control IC 134 and energizing the second LED array 126. The synchronization occurs as the second transistor 142 turns off, removing the ground signal from the Comp and RT/CT pins of second PWM control IC 134. This allows the use of lower operating frequency in conjunction with dim mode while maintaining stable LED current.

It is important to note that FIGS. 2A–2D illustrate specific applications and embodiments of the present invention, and is not intended to limit the scope of the present disclosure or claims to that which is presented therein. For example, switching devices such as FETs and transistors are illustrated, but other switching components such as transistors, MOSFETs, IGBTs, or bipolar transistors could be used in practicing the invention. As another example, synchronization of the PWM control IC is used here to obtain constant current even when the low frequency oscillation is relatively close to the operating frequency of the power supply. In some cases, some fluctuations might be acceptable and the synchronization may be omitted. Yet another possible embodiment of this circuit may use a peak current sensing technique rather than the one shown here to maintain constant peak LED current with varying duty cycles of the low frequency PWM signal. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system for supplying power for an LED array, said system comprising:
    an oscillator generating an oscillating signal, the oscillating signal having a first state and a second state; and
    a power supply operatively coupled to the oscillator, the power supply providing output power and being responsive to the oscillating signal;
    wherein said power supply supplies the output power to the LED array when the oscillating signal is in the first state and does not supply the output power to the LED array when the oscillating signal is in the second state.

2. The system of claim 1, wherein the output power is pulse width modulated power.

3. The system of claim 1, wherein the frequency of the power supply is about 20 kHz.

4. The system of claim 1, wherein the frequency of the oscillating signal is much lower than the frequency of the power supply.

5. The system of claim 1, wherein the duty cycle of the oscillating signal is about 10 per cent.

6. The system of claim 1, wherein the frequency of the oscillating signal is about 200 to 300 Hertz.

7. A system for supplying power for an LED array, said system comprising:
    means for sensing current to the LED array, said current sensing means generating a sensed current signal;
    means for generating a reference signal;
    means for comparing the sensed current signal to the reference signal, said comparing means generating a feedback signal;
    means for modulating pulse width responsive to the feedback signal, said pulse width modulating means generating a drive signal; and
    means for supplying power responsive to the drive signal, said power supplying means supplying current to the LED array.

8. The system of claim 7, further comprising:
    means for low frequency oscillating, said low frequency oscillating means generating an oscillating signal having a first state and a second state; and
    said power supplying means being responsive to the oscillating signal, said power supplying means supplying current to the LED array during the first state and blocking current to the LED array during the second state.

9. The system of claim 8, wherein the frequency of the oscillating signal is much lower than the frequency of the drive signal.

10. The system of claim 8, wherein the duty cycle of the oscillating signal is about 10 per cent.

11. The system of claim 8, wherein the frequency of the oscillating signal is about 200 to 300 Hertz.

12. The system of claim 8,
    wherein said pulse width modulating means is responsive to the oscillating signal from the low frequency oscillating means; and
    wherein said pulse width modulating means supplies the drive signal to said power supplying means during the first state and blocks the drive signal to said power supplying means during the second state.

13. The system of claim 12, wherein said pulse width modulating means synchronizes the drive signal from said pulse width modulating means with the oscillating signal from said low frequency oscillating means.

14. The system of claim 7, further comprising:
    means for indicating the LED array is inoperable.

15. A method of supplying power to an LED array, said method comprising:
    sensing current to the LED array and generating a sensed current signal;
    generating a reference signal;
    comparing the sensed current signal to the reference signal;
    generating a feedback signal based on the difference between the sensed current signal and the reference signal;
    generating a pulse width modulated drive signal based on the feedback signal; and
    supplying current to the LED array in response to the pulse width modulated drive signal.

16. The method of claim 15, further comprising:
    generating an oscillating signal having a first state and a second state; and
    supplying current to the LED array when the oscillating signal is in the first state and blocking current to the LED array when the oscillating signal is in the second state.

17. The method of claim 16, wherein the frequency of the oscillating signal is much lower than the frequency of the pulse width modulated drive signal.

18. The method of claim 16, wherein the duty cycle of the oscillating signal is about 10 per cent.

19. The method of claim 16, wherein the frequency of the oscillating signal is about 200 to 300 Hertz.

20. The method of claim 16, wherein a generation of a pulse width modulated power signal based on the feedback signal includes:
    generating a pulse width modulated power signal when the oscillating signal is in the first state; and
    blocking the pulse width modulated power signal when the oscillating signal is in the second state.

21. The method of claim 20, further comprising:
    synchronizing the pulse width modulated drive signal with the oscillating signal.

22. The method of claim 15, further comprising:
    monitoring the LED array; and
    indicating when the LED array is inoperable.

23. A circuit for supplying power to an LED array comprising:
    a power supply 52, the power supply 52 supplying current to the LED array 54 and being responsive to a drive signal;
    a current sensor 60 for sensing current to the LED array 54, the current sensor 60 generating a sensed current signal;

a reference current source 62 for generating a reference signal;

a comparator 58 for comparing the sensed current signal to the reference signal, the comparator 58 generating a feedback signal; and a PWM control IC 56 responsive to the feedback signal, the PWM control IC 56 generating the drive signal.

24. The circuit of claim 23, further comprising:

a low frequency oscillator, the low frequency oscillator generating an oscillating signal having a first state and a second state; and wherein said power supply is responsive to the oscillating signal, said power supply supplying current to the LED array during the first state and blocking current to the LED array during the second state.

25. The circuit of claim 24, wherein the frequency of the oscillating signal is much lower than the frequency of the drive signal.

26. The circuit of claim 24, wherein the duty cycle of the oscillating signal is about 10 per cent.

27. The circuit of claim 24, wherein the frequency of the oscillating signal is about 200 to 300 Hertz.

28. The circuit of claim 24, wherein said PWM control IC is responsive to the oscillating signal from the low frequency oscillator; and wherein said PWM control IC supplies the drive signal to said power supply during the first state and blocks the power signal to said power supply during the second state.

29. The circuit of claim 28, wherein said PWM control IC synchronizes the power signal from said PWM control IC with the oscillating signal from the low frequency oscillator.

30. The circuit of claim 23, further comprising:

an LED monitor, said LED monitor generating an LED array inoperable signal when said LED array is inoperable.

31. The circuit of claim 23, wherein said power supply is selected from a group consisting of a buck-boost power supply, a boost power supply, a buck power supply, and a flyback converter.

* * * * *